Nov. 1, 1960
G. G. PICKETT ET AL
2,958,501
AUTOMATIC CONTROL MECHANISM
Filed Dec. 26, 1957
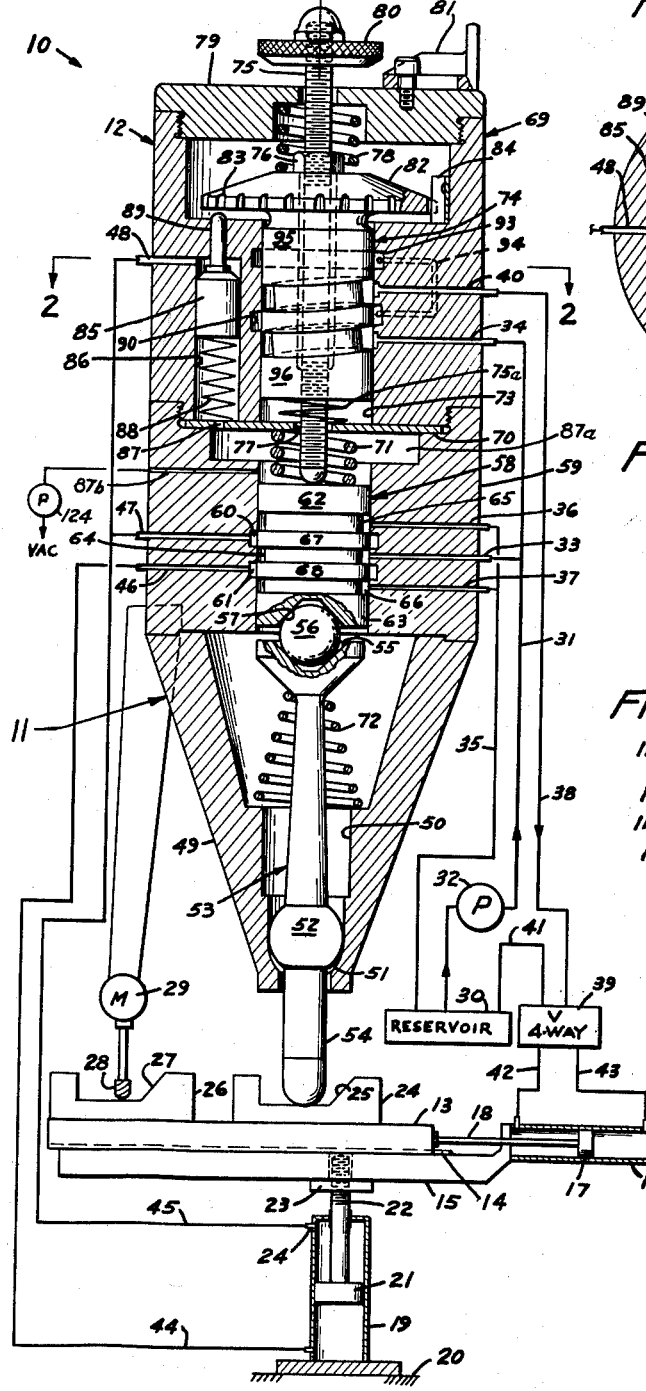
INVENTORS:
DANIEL P. McELRATH,
G. GORDON PICKETT
BY
D. Gordon Angus
ATTORNEY.

United States Patent Office 2,958,501
Patented Nov. 1, 1960

2,958,501
AUTOMATIC CONTROL MECHANISM

George Gordon Pickett, South Pasadena, and Daniel P. McElrath, Covina, Calif., assignors, by mesne assignments, to Banstrom Industries, Inc., Los Angeles, Calif., a corporation of Connecticut Filed Dec. 26, 1957, Ser. No. 705,229

3 Claims. (Cl. 251—3)

This invention relates to an automatic control mechanism for a machine tool, and to a spool valve which enables the mechanism to exert a close and sensitive control over a machine tool.

In such contour machining operations as the turning of shapes on a lathe, and in the sinking of cavities into forging dies and the like, it has heretofore been necessary for an operator to carefully control the machine tool in order to accurately create the desired contour and to prevent excessive cutting which would spoil the work.

In many types of cutting on mills and lathes, it has ordinarily been necessary to make cutting passes in two directions along the cutting plane in order to machine steep shoulders and the like. This lengthens the time needed to machine a given shaft, and is undesirable for that reason alone.

An object of this invention is to provide a machine tool control which exerts a close control over a machine tool, and which enables cavities and other sharp drops in profile to be machined by making only a single pass in one direction.

According to this invention, a machine tool is controlled in its cross movement by a tracer valve. A traverse control valve which controls the traverse rate of the machine tool is responsive to the position of said tracer valve, and permits traverse movement when it is in substantially equilibrium position and slows down or entirely stops traverse when the tracer valve is in a deflected condition.

Another feature of this invention resides in providing a spool valve in the traverse control valve with sleeve grooves and spool grooves which have control edges, at least one pair of which edges has progressively spaced points along the axis of the spool, a preferred embodiment being elliptical edges whose planes are disposed at an oblique angle to the central axis of the spool, whereby control of the rate of machine movement is adjustable both by rotating and by axially shifting the spool with respect to the sleeve.

The above and other features of this invention will be fully understood from the following detailed description and the accompanying drawings of which:

Fig. 1 is a side elevation partly in cut-away cross-section, and partly in schematic notation, showing an automatic control according to the invention applied to a die-sinker;

Fig. 2 is a cross-section taken at line 2—2 of Fig. 1;

Figs. 3 and 4 are elevations, partly in cut-away cross-section, showing alternative embodiments of a spool valve suitable for use in the device of Fig. 1; and Fig. 5 shows a fragmentary elevation, partly in cross-section, showing a portion of the valve of Fig. 1 in another adjusted position.

An automatic tool control mechanism according to the invention is shown in Fig. 1. This control incorporates two principal elements: a tracer valve 11 and a traverse control valve 12. Traverse control valve 12 is mounted to the top of the tracer valve 11. The combined valve controls the operation of a machine tool intended for duplicating a pattern contour. In the embodiment shown, the control is applied to a machine tool sinking cavities into the surface of a die so as to duplicate the cavity of a master pattern, or for creating any other desired concave or convex surface, the term "die-sinking" being utilized to generally describe the operation of the illustrated embodiment. It will be understood that control of the same relative movements makes the device applicable to contour cutting in general.

The elements of a die-sinking machine which are pertinent to this invention are shown in Fig. 1, and include a work table 13 mounted on slide ways 14 which are carried by a knee 15. To the knee there is mounted a hydraulic traverse cylinder 16 within which there is positioned a piston 17 having a rod 18 that is connected to the work table for sliding the work table along a first axis in a horizontal plane. A knee cylinder 19 is mounted to a foundation 20 and has within it a piston 21. A rod 22 projects into an opening in the knee. A rotatable nut 23 is threaded to the rod, and the elevation of the knee relative to the piston can be adjusted by turning the nut, because the knee rests on the nut. The knee cylinder and piston move the work table along a second axis, which is in a vertical plane.

A pattern 24 having a cavity 25 is mounted to the work table, as is a workpiece 26. A cavity 27 is to be sunk into the workpiece by a cutter 28 which is powered by a motor 29. The motor is mounted to the same structure as the control mechanism 10. It is the purpose of this mechanism to move the knee vertically, and the work table horizontally, so as to move the workpiece relative to the cutting tool to reproduce in the workpiece the contour of the pattern. It will be recognized that a lead screw or the like, and another slide, can be mounted to the knee for the purpose of moving the pattern and the workpiece along an axis perpendicular to the plane of Fig. 1 so that the die-sinker can operate to produce a three-dimensional cavity. Such additional cross-slides are well known in the art and require no discussion here.

The movements of the pistons within the cylinders are powered by a hydraulic system which draws liquid from a reservoir 30 and supplies it under pressure through a pressure supply conduit 31. Pump 32 in conduit 31 pressurizes the liquid. The pump provides pressurized hydraulic fluid to a first pressure port 33 in the tracer valve, and to a second pressure port 34 in the traverse control valve 12. An exhaust conduit 35 receives exhaust fluid from two exhaust ports 36, 37 in the tracer valve 11, the exhaust conduit discharging into the reservoir.

A traverse cylinder supply conduit 38 connects to a four-way valve 39 from a traverse cylinder supply port 40 in the traverse control valve 12. An exhaust conduit 41 interconnects the four-way valve to reservoir. Two conduits 42, 43 are connected between the four-way valve and the hydraulic cylinder 16 on opposite sides of the piston 17. The purpose of the four-way valve 39 is to connect a selected one of conduits 42 and 43 to the cylinder supply conduit 38, and the other one to the exhaust conduit 41 so as to enable a selection of work table direction to be made.

The knee cylinder 19 has connected to it a pair of knee cylinder supply conduits 44, 45, one entering the cylinder on each side of the piston 21. Conduit 44 is connected to a first knee cylinder supply port 46 in the tracer valve, and conduit 45 is connected to a second knee cylinder supply port 47 in the tracer valve, and also to a plunger port 48 in the traverse control valve.

The tracer valve and the traverse control valve are provided for selectively controlling the rate and direction of flow of hydraulic fluid from the pump to the knee cylinder and to the work table cylinder, respectively. The correct combination of these movements will cause the workpiece 26 to move relative to the cutter 28 so as to duplicate in the workpiece the contour of the cavity 25. This will machine a contour in the plane of Fig. 1 (called the "cutting plane"). It will be recognized that in order to create a complete cavity, it is only necessary to move the work table vertically with respect to the plane of Fig. 1 (that is on a cross-slide) so as to move the cutting plane across the workpiece.

The tracer valve 11 comprises a housing 49 which has a stylus passage 50 in its lower extremity. The stylus passage includes a rounded seat 51, so that a ball-like member 52 that is incorporated intermediate in the length of a stylus 53 is vertically slidable in the stylus passage but has its lower limit of movement defined by the seat 51. It will be seen that the tip 54 of the stylus is universally pivotable; that is, it has a limited pivotal movement in all directions relative to the axis of the stylus, and also has a limited upward and downward movement, the limit of the upward movement being defined by the abutment of various structures and the limit of the lower movement being defined by seating of ball-like member 52 on the seat 51.

At the top of the stylus there is a concave cone 55 sunk therein so as to support a ball 56. This ball projects into a concave cone 57 in the bottom of a spool 58. This spool fits within a sleeve 59, the sleeve being mounted to the housing 49.

The sleeve 59 is provided with a pair of cylindrical sleeve grooves 60, 61 which are in fluid communication with the cylinder supply ports 46, 47. The sleeve is also pierced by the first pressure port 33 and the exhaust ports 36 and 37, the exhaust ports being disposed on opposite sides of the pressure port and also on the opposite sides of the two cylinder supply grooves 60 and 61.

Spool 58 is provided with a pair of sealing lands 62, 63 at the opposite ends thereof and with three spool grooves. Spool groove 64 is a central groove which is always in fluid communication with the first pressure port 33. Exhaust spool grooves 65, 66 are on opposite sides of the pressure groove. Control lands 67, 68 stand between grooves 64 and 65, and between grooves 64 and 66, respectively. Grooves 65 and 66 are always in communication with exhaust ports 36, 37 respectively. It will be seen that shifting the axial position of the spool 58 in the sleeve enables the cylinder supply grooves 60 and 61 to be connected with either supply or exhaust connections, as appropriate.

The traverse control valve 12 includes a sleeve 69 which is threadedly engaged to the tracer valve. A retainer plate 70 is held between the two valves, and compresses a spring 71 against the top of the spool 58. This holds the elements of the tracer valve in firm abutment. A centralizing spring 72 fits within the stylus passage and biases the stylus toward a central position.

The sleeve 69 has a passage 73 which is preferably cylindrical, within which a spool 74 is fitted so as to be axially slidable in said passage. A counterweight spring 75a is placed between the retainer plate 70 and the lower end of the spool 74 so as to counteract the weight of the said spool. A rod 75 is threaded to, passes through, and projects beyond the spool. It is held in an adjusted position relative to the spool by a lock nut 76. The rod 75 projects through a hole 77 in the retainer plate and has a rounded lower end which rests atop the spool 58. The spool 74 therefore moves up and down with spool 58. A spring 78 is held against the top of spool 74 by a cap 79 and biases the spool 74 downward.

A handle 80 is mounted to the rod above the cap. A trigger 81 is pivotally mounted to the cap so that the handle, rod and spool 74 will be lifted when the trigger is pushed underneath the handle 80.

An adjustment ring 82 is incorporated in the spool 74 and has a plurality of notches 83 in its outer edge. These notches are engageable by a spring detent 84 which is mounted to the sleeve 69. The detent serves, by engaging into the notches, to hold the spool in a selected rotational position, but still permits the spool to move up and down along its axis.

A plunger 85 is slidably disposed in a plunger passage 86 which is adjacent and parallel to the sleeve passage 73. The plunger passage is vented to cavity 87a by port 87, and cavity 87a is connected by passage 87b to a vacuum pump 124. A spring 88 is placed in the plunger passage in opposition between the retainer plate 70 and lower end of the plunger. The plunger makes a fluid-sealing fit in its passage and has a contact point 89 which passes through the sleeve structure so as to be able to make contact with the under side of the adjustment ring 82. The plunger port 48 enters the plunger passage above the plunger.

The sleeve passage has sunk in its wall an oblique sleeve groove 90 which has two control edges 91, 92. These edges are formed at the intersection of the wall of the sleeve passage and the groove, and are conveniently formed by machining the groove in the sleeve at a cocked angle thereto. In such an arrangement, the central axis of the sleeve groove is disposed at an oblique angle to the central axis of the sleeve passage. The control edges are ellipses when the spool is a circular cylinder.

A by-pass groove 93 is formed in the wall of the sleeve passage above the oblique groove. The second pressure port 34 pierces the wall of the sleeve and enters the sleeve passage below the oblique sleeve groove, and cylinder supply port 40 pierces the wall of the sleeve and enters the sleeve passage between the by-pass groove 93 and the oblique groove 90. A by-pass conduit 94 interconnects the by-pass groove 93 and the oblique groove 90.

The spool has a diameter substantially equal to that of the sleeve passage so that it makes a slidable fluid seal in the sleeve passage. Sealing lands 95, 96 are disposed at the opposite ends of the spool. A pair of oblique spool grooves 97, 98 are cut in the surface of the spool between the sealing lands. These oblique grooves can conveniently be formed by chucking up the spool in a lathe so that the axis of the spool is oblique to the line of centers of the lathe, and then turning a groove in the spool.

As can be seen from Fig. 5, the bottoms of the spool grooves are simply cylinders cocked relative to the central axis of the spool. The two oblique spool grooves 97, 98 are spaced from each other by a control land 99 which has two control edges, a first edge 100 and a second edge 101. When the grooves are formed in the manner just described, these edges are ellipses each of whose planes is disposed at an oblique angle to the central axis 102 of the spool. As can best be seen from Fig. 5, it is desirable for the width of the control land to be greater than the spacing between the control edges 91 and 92, although this is not necessary, because the control land can be of a lesser length, so that the land "underlaps" rather than "overlaps" the groove when the grooves are aligned.

In Fig. 3 there is shown an alternative embodiment for the sleeve and spool for the transverse control valve. A sleeve 103 is provided with a pressure inlet 104 and a cylinder supply port 105. Within the sleeve there is a sleeve groove 106 which has a pair of control edges 107, 108, which control edges may be ellipses as described above. The planes of the ellipses are tilted with respect to each other rather than parallel to each other, as in the embodiment of Fig. 1. A control land 109 on a spool 110 has a pair of oppositely inclined grooves 111, 112. The pressure inlet 104 is in communication with groove 112, and cylinder supply port 105 is in communication with groove 111. Flow of fluid between the inlet 104 and the supply port 105 is controlled by the rotational and/or axial position of the spool and the sleeve.

In Fig. 4 there is shown still another valve embodiment in which a sleeve 113 has a pressure inlet 114 and a cylinder supply port 115. The sleeve has a pair of sleeve grooves 116, 117, each of which has a control edge 118, 119 respectively. These control edges are ellipses which are tilted with respect to each other and to the axis of the valve. A spool 120 has a single spool groove 121 with a pair of control edges 122, 123 therein. The planes of the control edges are disposed at an angle to each other. Flow of fluid between the inlet 114 and the supply port 115 is controlled by the rotational and/or axial position of the spool and the sleeve.

The essence of the arrangement of the spool groove and sleeve grooves in the traverse control valve is that the control edges have along them adjacent points which are axially and radially spaced from each other. Therefore when the spool is moved axially in the sleeve, the edge will progressively come into registration with a lateral cross-section of the sleeve. Evidently, there are many shapes which such an edge could take.

In all the figures, the control edges of the sleeve and of the spool make the same relative angle with the central axis. Accordingly, there is one rotational position of the sleeve (see Fig. 5) at which both control edges will simultaneously and immediately overlap each other. In any other rotational position, the control edges will gradually overlap as the spool is moved axially. If it is desired to overcome this limitation, the edges need only be formed such that corresponding axial points are spaced a different axial distance apart, for example, by forming the control edges of the sleeve grooves in a plane at one angle to the central axis and forming the spool valve control edges at a different angle to the central axis. In the construction of this particular device it is advantageous to provide them in the same angle and simply place the notches 83 on the spool so that the one unique rotary position illustrated in Fig. 5 will not be used.

The operation of this device will now be described. The control is shown in an equilibrium position in Fig. 1. In this position, the stylus tip 54 bears against the bottom wall of the cavity in pattern 24, and is lifted slightly off the seat 51 by that contact. This has lifted the spool 58 so that pressure is shut off to both conduits 44 and 45, trapping the fluid in cylinder 19 and holding the knee in a vertically adjusted position.

Spool 74 has been raised slightly so that pressure flows through pressure port 34 into oblique spool groove 98 past control edge 101 into oblique sleeve groove 90, past control edge 100 and into oblique spool groove 97, from which it flows out cylinder supply port 40 to the four-way valve 39. Depending on the setting of valve 39, the piston is forced by this hydraulic fluid in one direction or the other so that the table moves horizontally (traverse) relative to both the stylus and the cutter. Exhaust fluid flows from the other side of piston 17, out conduit 42, 4-way valve 39 and conduit 41 to reservoir.

Assuming that the table is traveling to the left in Fig. 1 and that the stylus will shortly be deflected sidewise and also moved upward by the rising surface of the pattern, then in order to duplicate the contour of the template the knee must permit the work table to move downward. Contact between the stylus tip and the rising pattern surface lifts and sidewardly deflects the stylus and displaces the spool 58 in an upward direction. This causes pressurized fluid to flow from pressure port 33 and groove 64 into cylinder supply groove 60, out cylinder supply port 47 and into the upper end of cylinder 19. This tends to move the piston 21 downward, and exhaust fluid flows through conduit 44 into cylinder supply port 46, cylinder supply groove 61, spool groove 66, out exhaust port 37, and through exhaust conduit 35 to reservoir.

While the above table adjustment is being made, it is desirable for the traverse rate of the table to be either slowed, or if the climb is steep enough (such as a vertical wall), stopped entirely. The deflection and rise of the stylus and the spool 58 causes spool 74 to move upward, also. When the device was in the equilibrium position shown in Fig. 1, and the spool rotated from the position shown in Fig. 1 so that there is some opening between spool and sleeve grooves, flow was permitted past the control edges 100, 101. A sufficient upward movement of the spool will cause the control edge 100 to completely overlap the control edge 92 of the sleeve groove. A relatively small movement of the spool will throttle and reduce the flow to the cross-cylinder as the result of a partial overlap of the control edges. The overlap is progressive so that the throttling action is gradual. A relatively larger displacement of the spool 74 will cause the control edges to overlap entirely and shut off the flow thereby stopping the traverse movement of the table until the table has dropped far enough to allow the stylus to move down and restore the spools to a position substantially in equilibrium. When the equilibrium position is substantially restored the traverse control valve is again fully reopened and the movement of the cross-slide continues at full speed. It will be understood that a gradual slope in the pattern merely slows down the traverse rate.

When the cavity deepens, the work table must be moved upward in order to machine the desired shape in the workpiece. When the pattern "falls away" beneath the stylus, the stylus drops and the ball-like member 52 tends to approach its seat 51. This permits the spool 58 to drop, thereby connecting pressure port 33 through groove 64 to cylinder supply groove 61, and thence through conduit 44 to the lower end of cylinder 19. This causes piston 21 to move the table upward, at the same time moving exhaust fluid through conduit 45, cylinder supply port 47, cylinder supply groove 60, spool groove 65, exhaust port 36, and thence out conduit 35 to reservoir.

At this time also, it is desirable for the traverse rate to slow down or even stop entirely. Therefore as the spool 74 drops with spool 58, control edges 101 and 91 increase their overlap, thereby either throttling or shutting off flow from the pressure port 34 to the cylinder supply port 40, depending on how far the spool 58 is shifted. This throttling off or closing action continues until the stylus again contacts the surface of the pattern and is restored by this contact to a nearly equilibrium position as shown in Fig. 1.

It will be observed that sidewise deflection of the stylus tip will cause the spools to be lifted, thereby slowing down or stopping the traverse movement, just as though the stylus were longitudinally deflected. For example, if a vertical wall in a cavity is struck, the stylus tip will be deflected substantially laterally and all traverse movement will be stopped as a consequence of the raising of spool 74, until the cutter passes upwardly and machines the vertical wall.

When passing along the top of a pattern and dropping off at a vertical wall, the stylus becomes a free dangling pendulum and the traverse movement stops because of the dropping of spool 74, while the cutting tool machines down the vertical wall. Therefore even vertical walls in which the cutter either climbs up or drops down to machine can be cut in a pass in one single direction.

When sinking deep cavities, a number of passes of increasing depth need to be made in the same plane. It therefore occasionally happens that the stylus is left hanging in the air out of contact with a deep pattern surface because the machine has been set to take a shallower cut. For this reason, a circuit is provided for restarting the traverse movement again when it has been stopped due to the dropping of spool 74. For example, when the stylus simply dangles in the air, the position of the two spools as just described with respect to cutting a deeper cavity, the traverse control valve stopped the machine's traverse feed, and unless something were done the machine would simply stop moving. Plunger 85 is provided for this purpose. It will be seen that the condition where the stylus is dangling in the air happens only when the piston 21 is at the top of its travel and no further vertical movement of the table can occur. It will also be noted that the piston 21 comprises, with its supply port 24, a slide valve so that when the piston itself reaches the top of its travel and closes port 24, conduit 45 is cut off at this point. It will also be noted that at this condition, conduit 45 is connected through cylinder supply port 47 in the tracer valve to the exhaust conduit 35 and reservoir. Therefore at this one unique condition the pressure in conduit 45 drops to nearly 0 gage pressure, or atmospheric. This removes the pressure at plunger port 48 and enables the spring 88 to move the plunger 85 upward so that the contact point 89 strikes the adjustment ring 82 and moves the spool 74 upward. This opens the traverse control valve and the traverse movement of the machine resumes. The traverse movement continues so long as the piston 21 is held up by the plunger.

At all other operating pressures of the piston, the line 45 is under some back pressure for the reason that when the valve is at equilibrium this conduit is shut off at the valve and pressure is maintained therein, and when the valve spool is moved in one direction or the other, there is either a direct positive pressure from the pump, or a back pressure resulting from throttling at the narrow orifice at the control edges of spool 58. Therefore, the plunger 85 is held down by fluid pressure except at the one unique condition when the piston 21 has moved its full stroke upward. The control therefore operates automatically under all conditions of contour configuration.

In setting up the tool it is often desired to be able to move the machine tool elements at a rate which is independent of the stylus control. For this purpose, either the handle 80 can be lifted manually, or the trigger 81 can be swung under handle 80 to lift it. This pulls rod 75 and lifts spool 74 so that control edge 100 overlaps the control edge 92 to shut off flow past that pair of control edges into the transverse control supply port 40. However, this movement still permits flow of fluid from pressure inlet port 34 into groove 90 from which it flows through by-pass passage 94 to by-pass groove 93. A sufficient upward movement of the spool will cause the spool groove 97 to register with the by-pass groove 93. By-pass groove 93 is thereby interconnected with the cylinder supply port 40, and supplies fluid under pressure through conduit 38 to the traverse cylinder 16. So long as the handle 80 is elevated, the traverse movement will continue independent of the tracer valve. To stop the transverse movement, it is only necessary to allow the handle 80 to fall again under the influence of spring 78.

In all of the figures, the control land is shown as overlapping its associated groove. With this arrangement it is possible for fluid flow to be shut off entirely when the members of a pair of control edges are aligned with each other as shown in Fig. 5. As stated above, this condition is obviated when the spool is turned sufficiently that the control edges overlap only in part, even at the equilibrium position. This permits traverse movement when the valve is in its equilibrium position, which is the desired situation for automatic machine movement. It is also possible to have the lands underlap the grooves, whereby the valve will never be shut off in the equilibrium position regardless of the rotary position of the spool in the sleeve. Either overlapped or underlapped control edges in the equilibrium position of spool 74 are within the scope of this invention.

It will be observed that the stylus is responsive to both impedance and relief in the pattern contour. Impedance occurs when the contour rises toward the control, and relief occurs when the contour "falls off" away from the control.

The spool and sleeve configurations shown in Figs. 3 and 4 have the same properties as those shown in Fig. 1, these being illustrated merely to show two more of the ways in which control edges can be disposed obliquely to each other, and in which a single spool groove, instead of a pair, can be used according to this invention.

The throttling and rate control features of the spool valve in the traverse control valve result from a pair of control edges, one on the spool, and one on the sleeve, which control edges can overlap to impede the flow of fluid past them. Providing each edge of this pair with a configuration in which there are radially and axially spaced points thereon enables a gradual throttling to result from either an axial or a rotary movement of the spool, and enables the rate of flow for a given axial movement to be governed by rotating the spool.

Because of the provision for stopping the traverse control at steep slopes or vertical walls, a machine tool provided with the control of this invention can manufacture a cavity by making a pass in one direction only, instead of needing two, thereby greatly reducing machining time.

In addition, the spool valve of this invention provides a very close control of rates. By turning the spool, rates of flow past the control edges for any given axial movement can be very closely regulated, and it is only necessary to rotationally adjust the spool and place the detent in a selected notch to achieve this purpose.

The terms "die-sinking" and "die-sinker" as used in this specification, relate to one type of machining on which this control is particularly useful. The control can also be used on other devices, such as lathe followers and the like. Therefore this invention is not limited to die-sinking, but includes all types of contour machines controllable by such valves, and, with respect to the valve components, to all valving applications wherein a rotatable and axial spool movement is useful to control fluid flow.

This invention is not to be limited by the embodiments shown in the drawings and described in the description, which are given by way of example and not of limitation, but only in accordance with the scope of the appended claims.

We claim:

1. In a spool valve which includes a valve sleeve with a circular cylindrical spool passage therein, and a circular cylindrical valve spool in said passage, the passage and spool having a common axis, the spool being axially slidably and rotatably movable in said spool passage in fluid sealing relationship thereto, a circumferential spool groove in said spool and a circumferential groove in the sleeve within the spool passage, and port means communicable with each of said grooves, whereby fluid flow between the grooves and port means is permitted when the grooves overlap, and is cut off when they do not overlap, the improvement comprising: a spool groove control edge on the spool bounding one side of the spool groove, a sleeve groove control edge on the sleeve bounding one side of the sleeve groove, each of the said control edges being at the side of their respective groove axially closer to the other groove, both of said control edges having the shape of a continuous, smooth curve, all adjacent points of which are radially and axially spaced from each other, whereby the amount of overlap of the grooves for an axial position of the spool in the sleeve is adjustable by rotating the spool in the sleeve so as to provide for regulation of fluid flow between port means as a function of both the axial and the angular position of the spool in the sleeve.

2. Apparatus according to claim 1 in which both control edges are substantially congruent.

3. Apparatus according to claim 2 in which each control edge lies in a plane canted relative to the axis, and is substantially elliptical.

References Cited in the file of this patent

UNITED STATES PATENTS

| | | |
|---|---|---|
| 847,326 | Ferris | Mar. 19, 1907 |
| 2,036,362 | Sassen et al. | Apr. 7, 1936 |
| 2,686,650 | Evans | Aug. 17, 1954 |
| 2,766,003 | Dall et al. | Oct. 9, 1956 |